(12) United States Patent
Palludo et al.

(10) Patent No.: US 12,462,861 B2
(45) Date of Patent: Nov. 4, 2025

(54) DEVICES, METHODS, AND SYSTEMS FOR CALIBRATING A SENSING CAPACITOR USED IN A SENSING CIRCUIT FOR READING MEMORY CELLS

(71) Applicant: Ferroelectric Memory GmbH, Dresden (DE)

(72) Inventors: Alessandro Palludo, Milan (IT); Stefano Sivero, Comun Nuovo (IT)

(73) Assignee: Ferroelectric Memory GmbH, Dresden (DE)

( * ) Notice: Subject to any disclaimer, the term of this patent is extended or adjusted under 35 U.S.C. 154(b) by 221 days.

(21) Appl. No.: 18/182,562

(22) Filed: Mar. 13, 2023

(65) Prior Publication Data

US 2024/0312507 A1  Sep. 19, 2024

(51) Int. Cl.
*G11C 11/22* (2006.01)

(52) U.S. Cl.
CPC ........ *G11C 11/2273* (2013.01); *G11C 11/221* (2013.01); *G11C 11/2275* (2013.01)

(58) Field of Classification Search
CPC .......................... G11C 11/2273; G11C 11/221; G11C 11/2275
See application file for complete search history.

(56) References Cited

U.S. PATENT DOCUMENTS

| | | | |
|---|---|---|---|
| 5,966,318 A * | 10/1999 | Ramer | G11C 11/22 365/145 |
| 7,660,146 B2 * | 2/2010 | Buehlmann | G11B 9/02 977/947 |
| 10,978,129 B1 | 4/2021 | Muller | |
| 11,049,541 B2 | 6/2021 | Muller | |
| 11,081,159 B1 | 8/2021 | Jahne et al. | |
| 11,101,291 B2 | 8/2021 | Mennenga et al. | |
| 11,158,361 B2 | 10/2021 | Muller | |
| 11,189,331 B1 | 11/2021 | Benoist et al. | |
| 11,195,589 B1 | 12/2021 | Ocker et al. | |
| 11,289,145 B2 | 3/2022 | Ocker | |
| 11,309,034 B2 | 4/2022 | Mennenga et al. | |
| 11,309,792 B2 | 4/2022 | Iqbal et al. | |
| 11,309,793 B2 | 4/2022 | Iqbal | |
| 11,335,391 B1 | 5/2022 | Ocker | |
| 11,380,400 B2 | 7/2022 | Noack | |
| 11,380,695 B2 | 7/2022 | Ocker | |
| 11,387,254 B2 | 7/2022 | Noack | |
| 11,393,518 B1 | 7/2022 | Ocker | |

(Continued)

*Primary Examiner* — Min Huang

(74) *Attorney, Agent, or Firm* — Synergy IP Group AG; Natalie A. Albrecht

(57) ABSTRACT

Disclosed herein are devices, methods, and systems for calibrating a sensing capacitance value used by a sensing circuit when reading memory cells of a memory. The calibration circuit includes a calibration cell associated with a predefined programming state of the calibration cell. The calibration circuit also includes a read circuit configured to perform a read operation on the calibration cell that generates a calibration voltage based on the predefined programming state and convert the calibration voltage to a target capacitance value based on the calibration voltage. The read circuit is configured to provide the target capacitance value to the memory as the sensing capacitance for the sensing circuit to use when reading the memory cells of the memory.

17 Claims, 10 Drawing Sheets

(56) References Cited

U.S. PATENT DOCUMENTS

| | | |
|---|---|---|
| 11,437,402 B2 | 9/2022 | Noack |
| 11,443,792 B1 | 9/2022 | Iqbal et al. |
| 11,475,935 B1 | 10/2022 | Ocker |
| 11,508,426 B1 | 11/2022 | Ocker |
| 11,508,428 B2 | 11/2022 | Noack et al. |
| 11,508,756 B2 | 11/2022 | Mennenga et al. |
| 11,527,551 B2 | 12/2022 | Ocker |
| 11,594,271 B2 | 2/2023 | Noack et al. |
| 11,594,542 B2 | 2/2023 | Polakowski |
| 11,605,435 B2 | 3/2023 | Schenk |
| 11,610,903 B2 | 3/2023 | Schenk |
| 11,626,164 B2 | 4/2023 | Noack |
| 11,682,461 B2 | 6/2023 | Mennenga et al. |
| 11,688,447 B2 | 6/2023 | Ocker |
| 2012/0170349 A1* | 7/2012 | Clinton ............... G11C 11/2253 365/145 |
| 2022/0051704 A1* | 2/2022 | Gupta .................. G11C 7/1039 |
| 2022/0084592 A1* | 3/2022 | Tamura ............. G11C 13/0064 |
| 2022/0122995 A1 | 4/2022 | Ocker et al. |
| 2022/0122996 A1 | 4/2022 | Ocker et al. |
| 2022/0139932 A1 | 5/2022 | Polakowski |
| 2022/0139934 A1 | 5/2022 | Muller |
| 2022/0139937 A1 | 5/2022 | Muller et al. |
| 2022/0270659 A1 | 8/2022 | Ocker |
| 2022/0374202 A1 | 11/2022 | Villa et al. |
| 2022/0376114 A1 | 11/2022 | Muller |
| 2023/0041759 A1 | 2/2023 | Noack et al. |
| 2023/0046259 A1 | 2/2023 | Iqbal |
| 2023/0135718 A1 | 5/2023 | Minh et al. |
| 2023/0170029 A1 | 6/2023 | Sivero |
| 2023/0189531 A1 | 6/2023 | Muller |
| 2023/0189532 A1 | 6/2023 | Muller |
| 2023/0223066 A1 | 7/2023 | Muller |
| 2023/0247842 A1 | 8/2023 | Muller |
| 2023/0284454 A1 | 9/2023 | Ocker et al. |
| 2023/0335174 A1 | 10/2023 | Kuzmanov |
| 2023/0360684 A1 | 11/2023 | Sivero |
| 2023/0371268 A1 | 11/2023 | Muller |

* cited by examiner

DEVICES, METHODS, AND SYSTEMS FOR CALIBRATING A SENSING CAPACITOR USED IN A SENSING CIRCUIT FOR READING MEMORY CELLS

TECHNICAL FIELD

This disclosure relates to non-volatile memories, and in particular, to memories that include state-programmable memory elements for storing the information.

BACKGROUND

Non-volatile memories allow for storing information in a memory, where the stored information is retained in the memory even after external power to the memory has been removed. Memories are typically formed from a number of memory cells, where each memory cell is able to store information in a state-programmable memory element (e.g., a ferroelectric memory element such as a ferroelectric capacitor) that is capable of retaining the written information based on a programmed state of the state-programmable memory element that is retained even after its power source has been removed. The programmed state usually represents a binary value (e.g., a "1" or a "0") that may be read out at later time by applying a read voltage sufficient to switch the state of the state-programmable memory element, and then determining the read state from the switching charge injected when the state-programmable memory element changes states. However, the switching charge generated by one cell may couple onto the control lines of other cells, causing a disturbance. Such a disturbance may cause the memory to read an incorrect state of the impacted cell(s). This may be particularly problematic in a memory with an "all bit line" (ABL) architecture, where multiple (e.g., all) bit lines may be read simultaneously, especially for long bit lines that may service memory cells far away from the virtual ground node of the sensing amplifier circuit used to read the memory cell.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1:
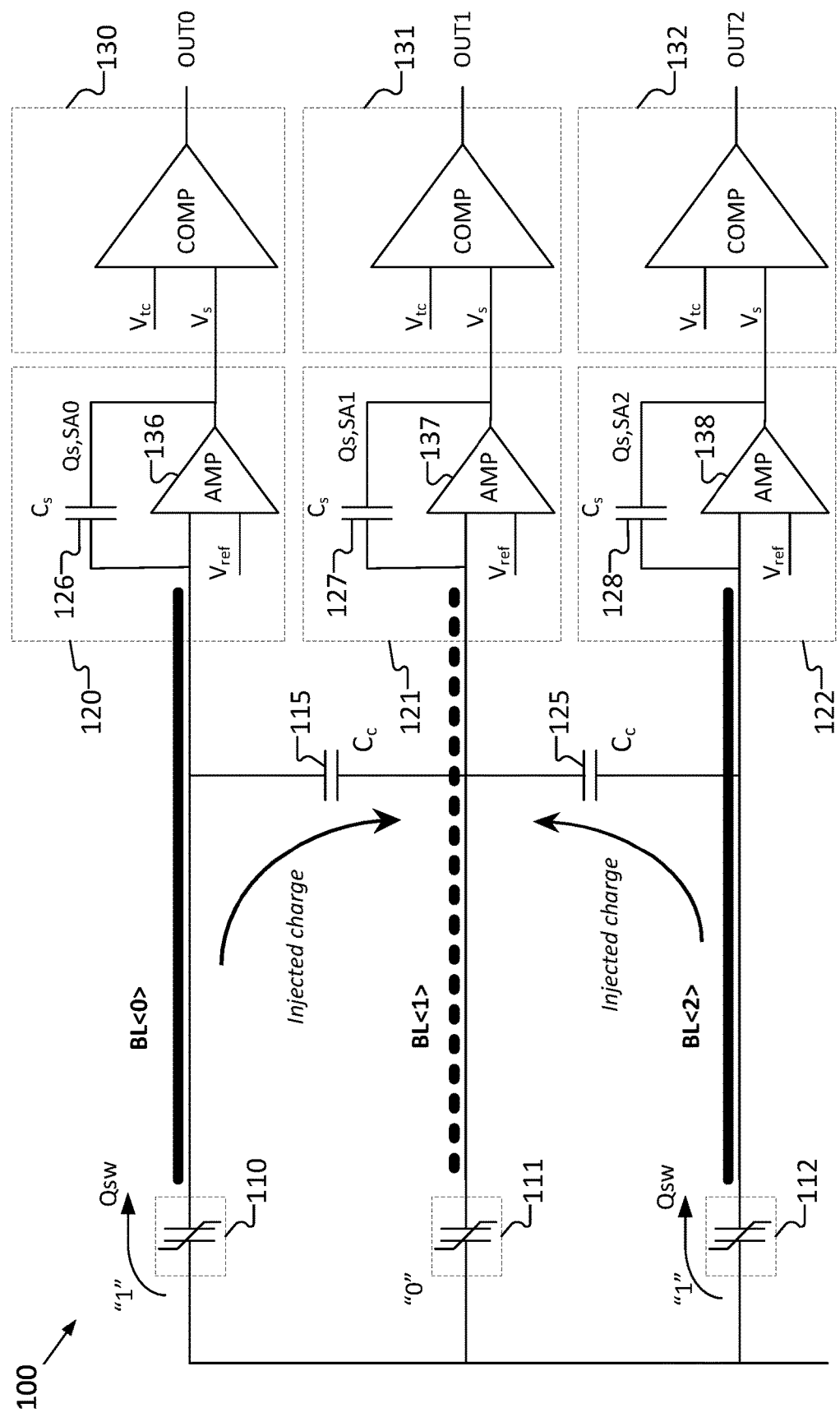
FIG. 1 shows an example of a memory architecture that may be susceptible to incorrect reads due to coupled charges from one bit line to another.

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects may be combined with one or more other aspects to form new aspects. Various aspects are described in connection with methods and various aspects are described in connection with devices. However, it may be understood that aspects described in connection with methods may similarly apply to the devices, and vice versa.

In general, non-volatile memories are typically formed from a number of memory cells, where each memory cell stores one of two states: a first state representing the off state (e.g., "0") and a second state representing the on state (e.g., "1"). The individual memory cells that form the memory are typically organized into control groupings of cells, where each cell may be individually addressed but have a common control scheme for biasing the cells via control lines such as bit lines (e.g., for operating the cells grouped in the same column), word lines (e.g., for operating cells grouped in the same row), and/or plate lines (e.g., for operating cells grouped so as to share a common node such as a same "plate"). Among other components, memory cells may include a state-programmable memory element (e.g., a ferroelectric memory element such as a ferroelectric capacitor) that is capable of retaining the written information by writing one of two remanent states of the memory element.

As used throughout this disclosure, a state of a memory element is described as "remanent" where the memory element is capable of retaining its programmed state even when it is not connected to a power source. As also used throughout, the current remanent state to which the memory element has been set may be referred to as the "stored" state, the "written" state, or the "programmed" state. As should be understood, when referring to a state-programmable memory element, the terms "write," "store," or "program"

are used generically to refer to setting the remanent state of the state-programmable memory element(s). As is understood, the term "voltage" may be used herein with respect to "a bit line voltage", "a word line voltage," "a plate line voltage," and the like. The "voltage across" a component may be used herein to denote a voltage drop from a node on one side of a component (e.g. one side of a capacitor) to a node on the other side of the component (e.g., the other side of the capacitor).

When a state-programmable memory element includes ferroelectric material (e.g., a ferroelectric capacitor), the remanent state is understood as referring to a remanent polarization state that is set by applying a particular voltage across the element that is sufficient to set a corresponding polarization state, where, once set, the remanent polarization state is retained by the element even when the voltage across the element has been removed (e.g., it is remanently-polarizable). Once such an element has been state-programmed to a remanent state, it generally retains the programmed state until it is re-programmed by applying a voltage across it that is sufficient to program the element to a (e.g., new) remanent state. A polarization capability of a state-programmable memory element (e.g., remanent polarization capability, e.g., non-remanent spontaneous polarization capability) may be analyzed using capacity measurements (e.g., a spectroscopy), e.g., via a static (C-V) and/or time-resolved measurement or by polarization-voltage (P-V) or positive-up-negative-down (PUND) measurements. Another method for determining a polarization capability of a state-programmable memory element may include transmission electron microscopy, e.g., an electric-field dependent transmission electron microscopy.

As noted above, a typical memory includes multiple memory cells where each memory cell contains a memory element that represents information by being programmable to different states, each state corresponding to different stored information (e.g., a stored value of "0" may be represented by a first programming state and "1" may be represented by a second programming state). Once the memory element of the memory cell has been programmed, the programmed state may be read out using a read operation. In the read operation, a read voltage may be applied to the memory element to switch its programmed state and develop a charge in a sensing circuit, a sensed voltage of which may then be compared to a threshold reference voltage to determine the programmed state.

With certain memory cell configurations and sensing architectures, a disturb may occur on the control lines of the memory element, which may cause an incorrect read of the programming state of memory element. For example, in an All Bit Line (ABL) architecture, a group of memory elements may be read simultaneously by applying a read voltage to a plate line that is common to the group and then sensing the charge developed on each memory element's corresponding bit line. However, when the common read voltage is applied, the induced charge from one bit line (an "aggressor" bit line) may couple onto another bit line (a "victim" bit line). As a result, the coupled charge may cause an incorrect read of memory cells associated with the "victim" bit line.

Figure 2B:
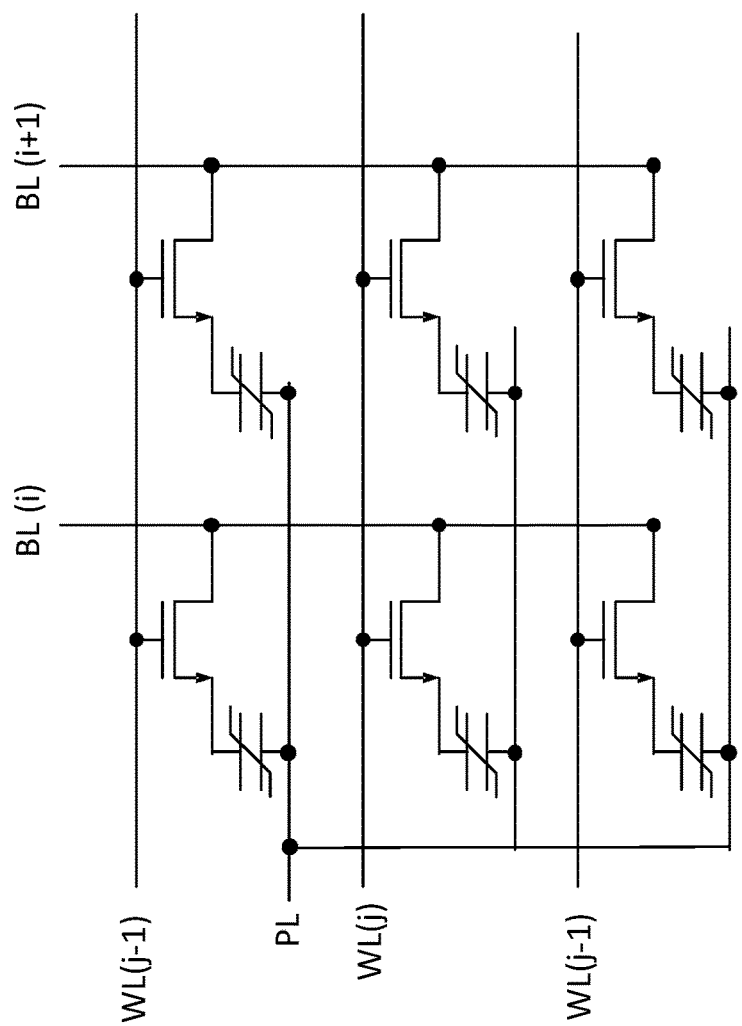
FIG. 2B depicts an example of multiple memory cells with a shared plate line and different groupings of cells with a common bit line(s) and/or common word line(s) for controlling the memory cells through access transistors.
Figure 2A:
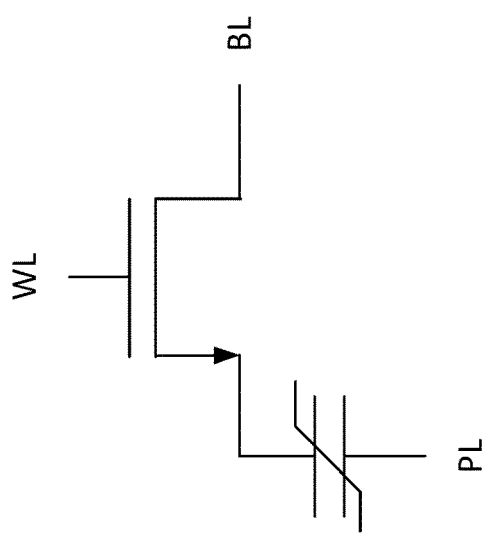
FIG. 2A shows an example configuration for controlling a memory cell via a plate line, word line, and bit line through an access transistor.

FIG. 1 shows an example of a memory 100 with a memory architecture (e.g., an ABL architecture) that may be susceptible to incorrect reads due to coupled charges from bit line to bit line. As should be appreciated, the depiction of the memory architecture in FIG. 1 is not meant to show all elements that would be part of memory 100, which may include, for example, access transistors operated by a word line (WL), as shown for example in FIG. 2A for a single memory cell and as shown in FIG. 2B for multiple memory cells with a shared plate line (PL) and different groupings of cells with a common bit line(s) (e.g., for columns controlled by BL(i) and BL(i+1), respectively) and/or common word line(s) (e.g., for rows controlled by WL(j) and WL(j−1), respectively). Rather, the depiction in FIG. 1 is merely used to show a potential source of disturbance when reading memory cells. Memory 100 has a group of three memory cells that are configured to be read-out at the same time: a first memory cell made of ferroelectric capacitor 110, a second memory cell made of ferroelectric capacitor 111, a third cell made of ferroelectric capacitor 112. Each memory cell of the group is fed by a common plate line (PL) on one side of each respective ferroelectric capacitor. The other side of each ferroelectric capacitor is connected to a corresponding bit line (BL), for example, through an access transistor. During a read operation of the group, a read circuit applies a read voltage to the common plate line (PL), which in turn may develop a switching charge to each individual bit line, depending on the programmed state of the memory cell and the applied read voltage. The read circuit then senses the switching charge in a sensing circuit (e.g., sensing circuits 120, 121, and 122) that converts the sensed charge ($Q_s$) into a sensed voltage (Vs) via a sensing amplifier (e.g., sensing amplifiers 136, 137, and 138) that integrates the charge over a sensing capacitor (e.g., sensing capacitors 126, 127, and 128). The read circuit may then compare the sensed voltage in a comparison circuit (comparison circuits 130, 131, 132) that compares the sensed voltage to a predetermined threshold voltage to output the read state of the corresponding memory cell (e.g., at OUT0, OUT1, and OUT2).

As depicted in the example of FIG. 1, the first memory element (e.g., ferroelectric capacitor 110) has been programmed to a "1" state, the second memory element (e.g., ferroelectric capacitor 111) has been programmed to a "0" state, and the third memory element (e.g., ferroelectric capacitor 112) has been programmed to a "1" state. Assuming, for example, that when the read voltage is applied to the common PL, a memory cell programmed to a "1" state is configured to develop a charge $Q_{sw}$ onto its bit line and a memory cell programmed to a "0" state is configured to develop no charge onto its bit line. Typically, sensing circuits (e.g., sensing circuits 120, 121, 122) are used to convert the sensed charge ($Q_s$) into a sensed voltage (Vs), and comparison circuits (e.g., comparison circuits 130, 131, and 132) are used to compare the sensed voltage to a predetermined threshold voltage defining the separation between one programming state and the other programming state. Ideally, the predetermined threshold would be set in the middle of the voltage range between the sensed voltage associated with a "0" and the sensed voltage associated with a "1."

With reference to sensing circuit 120 and comparison circuit 130 of FIG. 1, for example, the output of sensing circuit 120 (Vs) is proportional to the charge ($Q_s$) which flows across the feedback or sensing capacitor (Cs) as compared to an input reference voltage (Vref):

$$Vs = Vref - Qs/Cs$$

Ideally (without disturb), in the above formula $Q_s=Q_{sw}$ of the memory cell (e.g. ferroelectric capacitor 110), where the maximum $Q_{sw}$ ($Q_{sw,max}$) is twice the remanent polarization of the ferroelectric capacitor 110 associated with the "1"

state and $Q_{sw}$ is 0 when the ferroelectric capacitor 110 is programmed to the "0" state. If Vs0 is defined as the voltage corresponding to the charge developed by a "0" state of the ferroelectric capacitor 110 and Vs1 is defined as the voltage corresponding to the charge developed by a "1" state of the ferroelectric capacitor 110, it follows that:

$$Vs0 = Vref \text{ (because } Qs = Qsw = 0)$$

$$Vs1 = Vref - Qsw/Cs$$

Thus, it follows that:

$$|Vs1 - Vs0| = Qsw/Cs$$

The sensed voltage (Vs) is output to a comparing circuit 130 that compares a threshold voltage (Vtc) to the sensed voltage in order to determine whether the sensed voltage corresponds to a "0" state or "1" state. To do this, the threshold voltage is ideally set in the middle of the Vs1–Vs0 range:

$$Vtc = Vref - \frac{1}{2}Qsw/Cs$$

Thus, in order for the comparing circuit 130 to correctly read the memory cell, the charge ($Q_s$) across the feedback capacitor (Cs) to read the "0" state must be less than ½ $Q_{sw}$ and to read the "1" state must be greater than ½ $Q_{sw}$.

However, when considering a large array of memory cells, there may be a large distribution in the charge developed by each memory cell and therefore a large distribution in charges accumulated on the feedback capacitor and therefore a large distribution in the sensed voltages associated with a "0" or with a "1." As such, the predetermined voltage may be set to the minimum voltage level sufficient to read the lowest charge developed by the "1" state when considering the distribution ($Q_{sw,min}$). With this in mind, the predetermined threshold voltage may be fixed to a value of:

$$Vtc = Vref - \frac{1}{2}Qsw, \min/Cs$$

And in order for the circuit to correctly read the "0" state, the charge ($Q_s$) across the feedback capacitor (Cs) must be less than ½ Qsw, min.

However, when the sensing and comparison circuits are configured to be able to read low developed charges (e.g., less than ½ $Q_{sw,min}$), this may make them susceptible to misreading a disturbance as if it were the charge developed by the memory cell intended to be read (e.g., a disturbance in the form of a charge coupled onto the bit line from sources other than from the memory cell intended to be read), especially where the $Q_{sw}$ of a particular cell is much larger than $Q_{sw,min}$. In other words, while the ideal charge developed in the sensing circuit ($Q_s$) should be the switching charge ($Q_{sw}$), a portion of the switching charge may be coupled to another bit line such that the actual charge developed in the sensing circuit is $Q_{sw}-\Delta$, where $\Delta$ is the disturbance charge coupled onto another bit line(s). If a bit line receives a disturbance from more than one bit line, for example from each of two adjacent bit lines, the disturbance charge may be doubled (e.g., 2Δ). If the total disturbance is high enough (e.g., it exceeds $Q_{sw,min}$), the read operation may misread the state of the memory cell. An example of such a problem is discussed in more detail below, where a disturbance may be caused by a switching charge from a memory cell programmed to the "1" state (an "aggressor" bit line) that injects a portion of the switching charge onto a neighboring bit line (a "victim" bit line).

For example, with reference to FIG. 1, due to a coupling capacitance (Cc) between adjacent bit lines (e.g., coupling capacitance 115 between BL0 and BL1 and coupling capacitance 125 between BL1 and BL2), a portion of the switching charge developed on the bit lines associated with a programming state of "1" (BL0 and BL2) may be injected as a disturbance on the bit line associated with a programming state of "0" (BL1). Long bit lines may be particularly susceptible to such disturbances, where the memory cells are far away from the virtual ground node of the sense amplifier. If the injected disturbance charge is high enough (e.g., it exceeds $Q_{sw,min}$), it may cause the sense circuit (e.g., sense circuit 121) to output a sense voltage such that the comparison circuit (e.g., comparison circuit 131) outputs an incorrect read result (e.g., OUT1 reflects a reading of "1" instead of "0").

To reduce the likelihood of disturbance causing a misread of memory cells, disclosed below is an improved circuit for calibrating the sensing capacitance used in the sensing circuit over which the switching charge is integrated during a read operation of the memory cells. In particular, a calibration circuit may be used to determine, based on a read of a calibration memory cell that has been set to a predefined programming state, a sensing capacitance value to use during a read operation to help ensure a correct read of the programmed state of the memory cells. For example, in an ABL architecture, where the memory applies the read voltage to the plate line to generate a switching charge that is integrated over a sensing capacitance to generate a sensed voltage (Vs), the calibration circuit may determine a target sensing capacitance value based on a read operation on a calibration cell or group of calibration cells, and then the memory may use this determined target sensing capacitance value in the sensing circuit as the sensing capacitance when reading the memory cells. In this manner, because the gain of the sensing circuit is determined by the target sensing capacitance value, the induced charge from one bit line (an "aggressor" bit line) that is coupled onto another bit line (a "victim" bit line) may be minimized, thus the effect on the "victim" bit line sensed voltage (Vs) is minimized similarly, and the read operation correctly reads the memory cells. As should be appreciated, while an ABL architecture has been used herein as an exemplary memory architecture in which the disclosed calibration circuit may be particularly useful, the disclosed calibration circuit may be applied to any type of memory architecture where calibrating a sensing capacitance value is desired.

Figure 3:
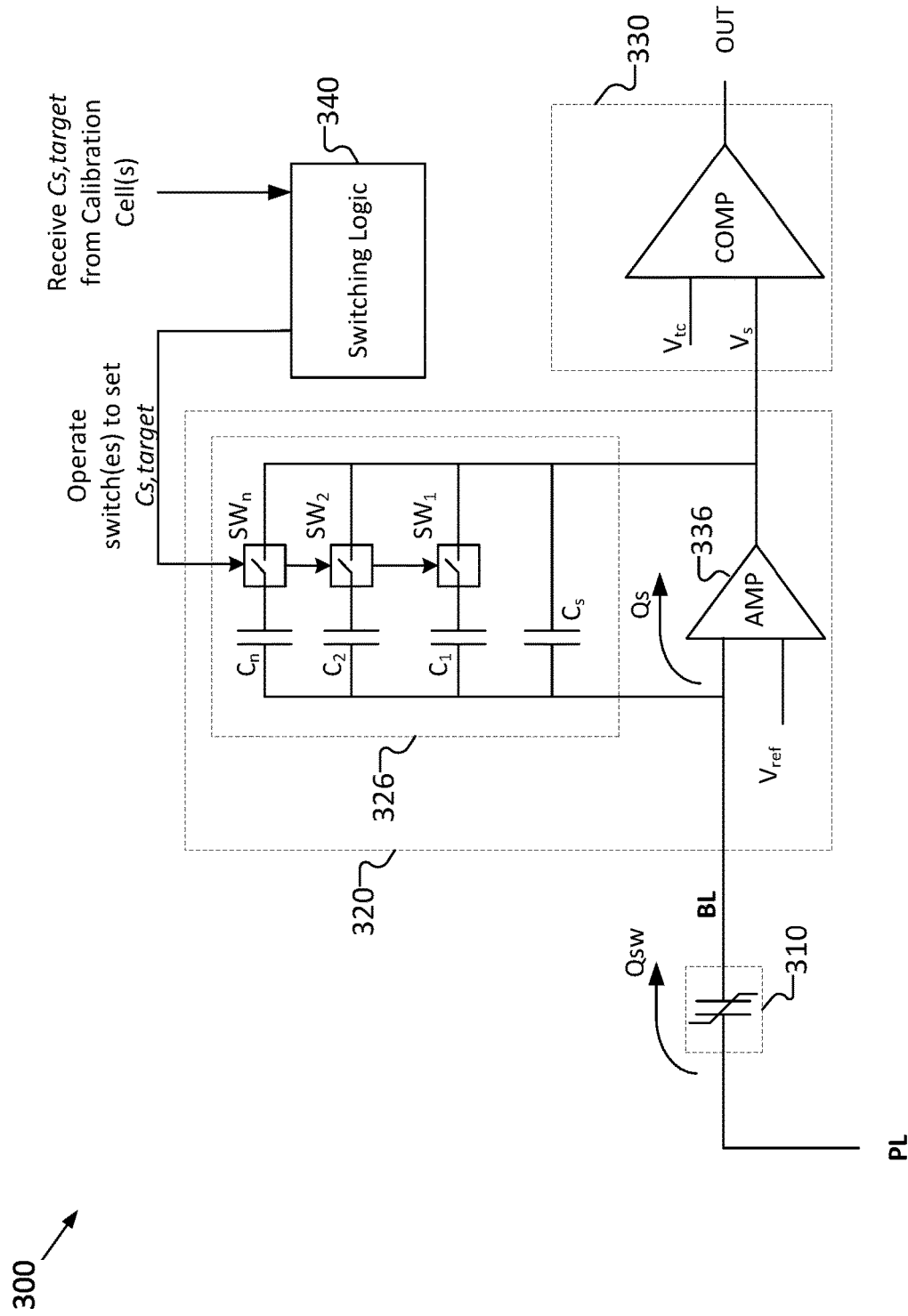
FIG. 3 illustrates an exemplary memory with an architecture that has a configurable sensing capacitance that may be used by the memory when reading a memory cell.

FIG. 3 shows an example of an improved memory 300 with an architecture that may reduce incorrect reads due to coupled charges (disturb) from bit line to bit line. For simplicity, memory 300 shows only one memory cell (e.g., ferroelectric capacitor 310), though it should be appreciated that the memory may have any number of memory cells, any number of which may be grouped together and connected on one side to the same plate line (PL). The other side of the memory cell (e.g., the other side of ferroelectric capacitor 310) may be connected to a corresponding bit line (BL), for example, through an access transistor (not shown). During a read operation, a read circuit applies a read voltage to the common plate line (PL), which in turn may develop a switching charge ($Q_{sw}$) to the bit line, depending on the programmed state of the ferroelectric capacitor and the applied read voltage. The read circuit then senses the switching charge in a sensing circuit (e.g., sensing circuit 320) that converts the sensed charge ($Q_s$) into a sensed voltage (Vs) by integrating the charge over a sensing capacitor 326 on the feedback port of sensing amplifier 336. The read circuit may then compare the sensed voltage in comparison circuit 330 to compare the sensed voltage to a predetermined threshold voltage (Vtc) to output the read state of ferroelectric capacitor 310 (e.g., at OUT).

Importantly, the sensing capacitor 326 may have a configurable capacitance that is configured based on a target sensing capacitance received from a calibration circuit that has determined the target capacitance value based on a calibration cell. A switching logic 340 may receive the target sensing capacitance from the calibration circuit and then tune the value of the sensing capacitor 326 to the target sensing capacitance value. While FIG. 3 shows a number of differently valued capacitors (e.g., C1, C2, . . . . Cn, etc.) in a ladder structure with Cs that may be switched in or out of the circuit (e.g., using SW1, SW2, . . . . SWn, etc.) to set the target sensing capacitance value, any way of tuning the capacitance of sensing capacitor 326 to the target sensing capacitance value may be used.

Figure 4:
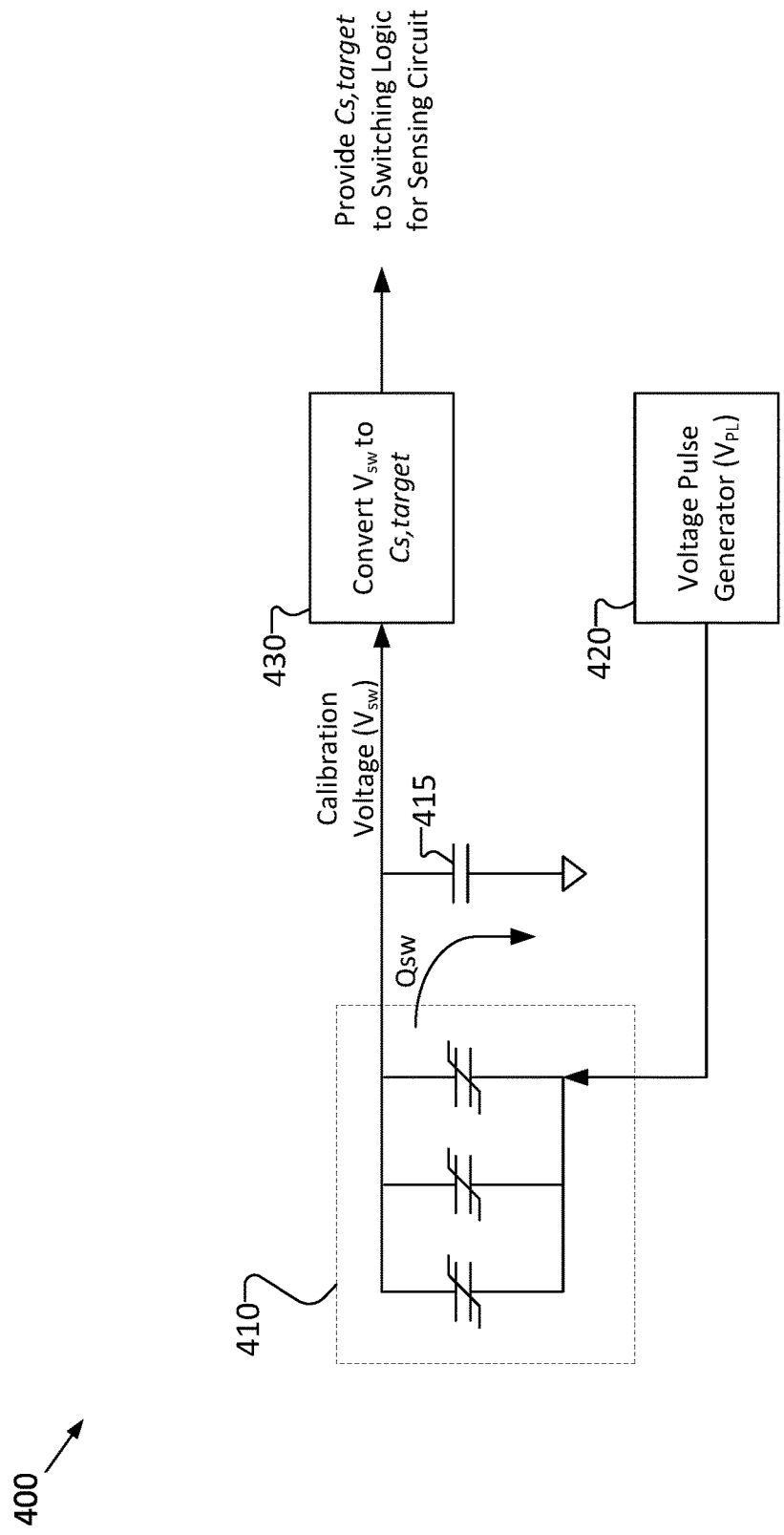
FIG. 4 depicts an exemplary calibration circuit that uses multiple calibration cells in parallel to determine a target sensing capacitance to be used by the memory as the sensing capacitance when reading a memory cell.

FIG. 4 shows an example of a calibration circuit 400 for determining a target sensing capacitance based on a calibration cell 410. Calibration cell 410 may be a memory cell of the memory (e.g., a state programmable memory element (e.g., a ferroelectric capacitor)) that is not used for storing memory information, but rather is used as a reference for determining an "ideal" sensing capacitance value. The calibration cell 410 may be pre-programmed to a predetermined programmed state (e.g., a state associated with a "1" (e.g., a remanent polarization state of a ferroelectric capacitor that causes a switching charge when a voltage is applied across the capacitor sufficient to switch its programming state in a read operation)). The voltage applied across the calibration cell 410 during the read operation may be provided by a pulse generator 420 that provides a voltage pulse to one side of calibration cell 410. This develops a switching charge ($Q_{sw}$) that is converted to a calibration voltage (Vsw) over a calibration capacitor 415. The calibration voltage (Vsw) may then be converted, in conversion circuit 430, into a target sensing capacitance value (Cs,target) that is provided to the switching logic (e.g., switching logic 340 shown in FIG. 3) for tuning the sensing capacitance of the sensing circuit to the target sensing capacitance value. The conversion circuit 430 may, for example, be an analog-to-digital converter (ADC) that converts the voltage level of the calibration voltage to a digital code representing a target sensing capacitance that is based on the calibration voltage (e.g., having a relationship, having a direct relationship, having a proportional relationship, having a direct proportional relationship, etc.). For example, if there is a direct relationship, a higher calibration voltage may result in a higher target sensing capacitance and a lower calibration voltage may result in a lower target sensing capacitance. The digital code representing the target sensing capacitance may then be provided to and decoded by the switching logic (e.g., switching logic 340 shown in FIG. 3), which uses the decoded value to configure the sensing capacitance of the read circuit to the target sensing capacitance.

As should be understood, the calibration may be performed before each read operation of the memory, during power-up, at regular or irregular intervals, and/or based on any other trigger event (e.g., passage of time, when the temperature changes, after a certain number of read/write operations, etc.) so that the determined target sensing capacitance ensures a correct read of the memory cells. As should also be understood, the sensing and coding scheme is merely exemplary, and any type of sensing and coding scheme may be used to determine the target sensing capacitance from the calibration cell 410. In addition, it should be understood that the conversion circuit 430 may be implemented as an analog circuit, digital circuit, or any combination thereof and the target sensing capacitance determined in the calibration circuit 400 may be provided to the sensing circuit of the memory in any manner. For example, as noted above, the conversion circuit 430 may use an analog-to-digital converter (ADC) to convert the calibration voltage level into a digital representation of the target sensing capacitance value so that it may be counted, incremented, compared to past values, and/or provided to the memory as the final target sensing capacitance value to be used in the sensing circuit when reading the memory cells of the memory.

As should also be appreciated, the calibration cell 410 may include more than one cell (e.g., more than one state-programmable memory element (e.g., more than one ferroelectric capacitor)), which may be read by the calibration circuit 400 in a parallel (e.g., representing a median behavior) and/or in a sequential manner (e.g., representing a worst case among calibration cells). For example, FIG. 4 shows a calibration circuit 400 with a group of three calibration cells 410 that are configured to be read in parallel during a read operation of the calibration circuit 400, where the charge developed to calibration capacitor 415 is the cumulative charge (e.g., median charge) of the group of three calibration cells 410. The calibration cells 410 may be read by applying a read voltage to one side of the calibration cells 410 that develops a switching charge to calibration capacitor 415 and a corresponding calibration voltage (Vsw) at the input to the conversion circuit 430. While three cells are shown in FIG. 4, this is merely exemplary and any number of cells may be used for the calibration cells 410.

Figure 5:
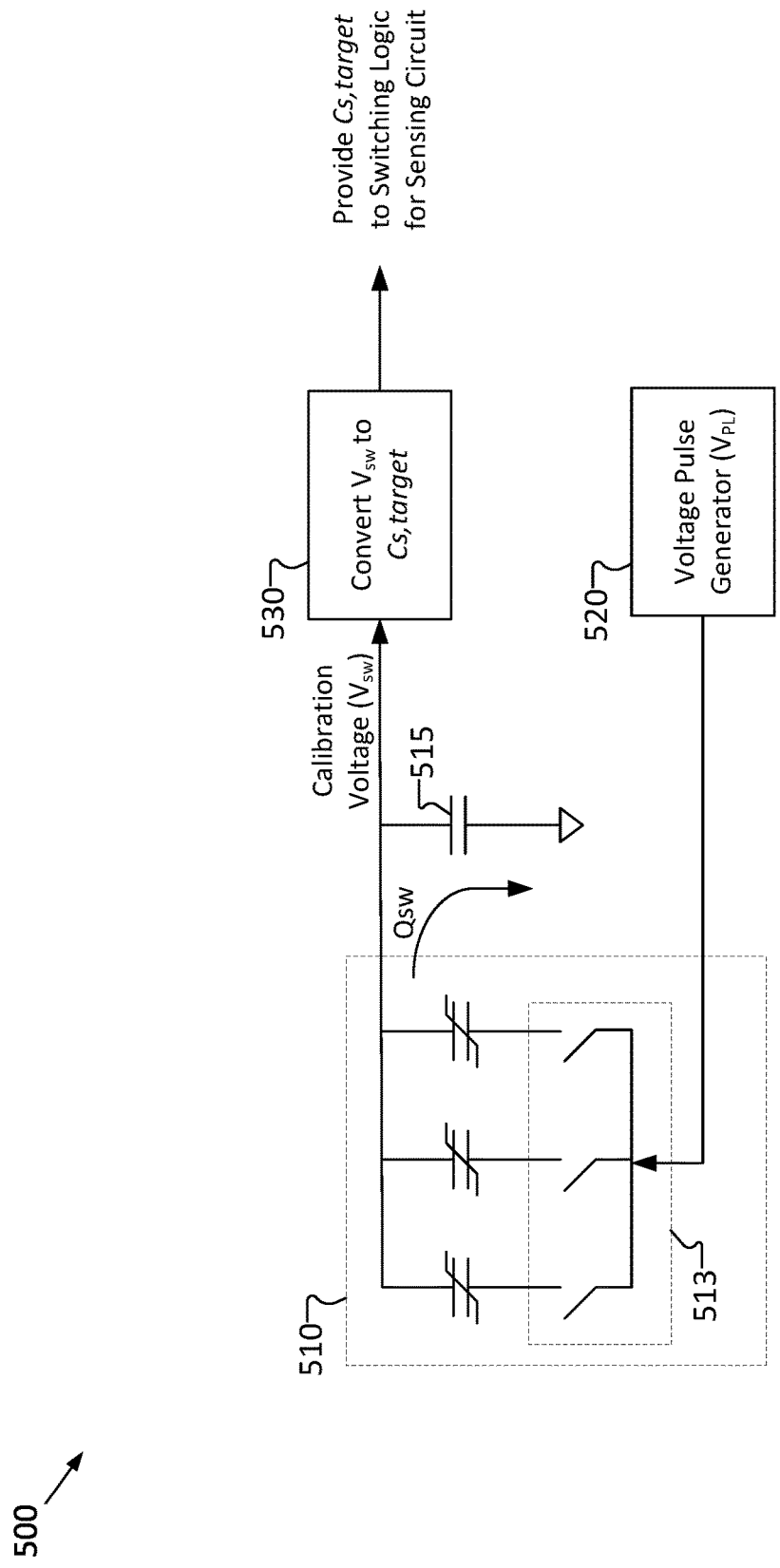
FIG. 5 depicts an exemplary calibration circuit that uses multiple calibration cells in sequence to determine a target sensing capacitance to be used by the memory as the sensing capacitance when reading a memory cell.

As another example, FIG. 5 shows a calibration circuit 500 with three calibration cells 510 that are configurable to be read in sequence (e.g., individually) during a read operation of the calibration circuit 500, where the charge developed to calibration capacitor 515 is the charge developed by a selected one of the calibration cells 510. For example, one or more switches 513 may be used to selectively switch an individual one of the calibration cells 510 as the selected calibration cell to be used during the read operation of the calibration circuit 500. As with calibration circuit 400, a read voltage level is applied to the first selected calibration cell and the calibration voltage (Vsw) is converted into a target sensing capacitance in a conversion circuit 530, where the target sensing capacitance is based on the calibration voltage (e.g., having a direct relationship, where a higher calibration voltage results in a higher target sensing capacitance and a lower calibration voltage results in a lower target sensing capacitance). After the calibration circuit 500 has determined the target sensing capacitance based on the first selected cell, the calibration circuit 500 may select (e.g., using switches 513) another one of the calibration cells 510, perform a read operation on the newly selected cell, converting the newly measured calibration voltage to a new target sensing capacitance. If the new target sensing capacitance meets a predefined criterion with respect to the first target sensing capacitance (e.g., the new target sensing capacitance is larger than the first target sensing capacitance), the new value is stored as the target sensing capacitance. This process may be repeated for each cell of the calibration cells 510. In this manner, the resulting target sensing capacitance provided by the calibration circuit 500 to the memory represents the worst case target sensing capacitance for the given predefined criterion (e.g., the highest capacitance) among the calibration cells 510. As should be understood, any number of cells may make up the calibration cells 510 and any type of predefined criterion may be used to select the final target sensing capacitance from among the individual read operations of the differently selected cells.

As should also be appreciated, the calibration circuit (e.g., calibration circuit 400 and/or 500) may use any combination of the parallel and sequential methods discussed above. For example, with reference to FIG. 5, calibration circuit 500 may select N multiple cells (e.g., not just an individual cell, but any number N) from calibration cells 510, where the composite charge provided by the N multiple cells represent the median charge over the N selected cells, and then convert the resulting composite calibration voltage to a target sensing capacitance. Then, the calibration circuit 500 may sequentially select other grouping(s) of N multiple cells from calibration cells 510 (e.g., using switches 513), and convert the newly measured calibration voltage to a new target sensing capacitance. If the new target sensing capacitance meets a predefined criterion with respect to the first target sensing capacitance (e.g., the new target sensing capacitance is larger than the first target sensing capacitance), the new value is stored as the target sensing capacitance. This process may be repeated for each selected grouping of the N multiple cells of the calibration cells 510.

Figure 6:
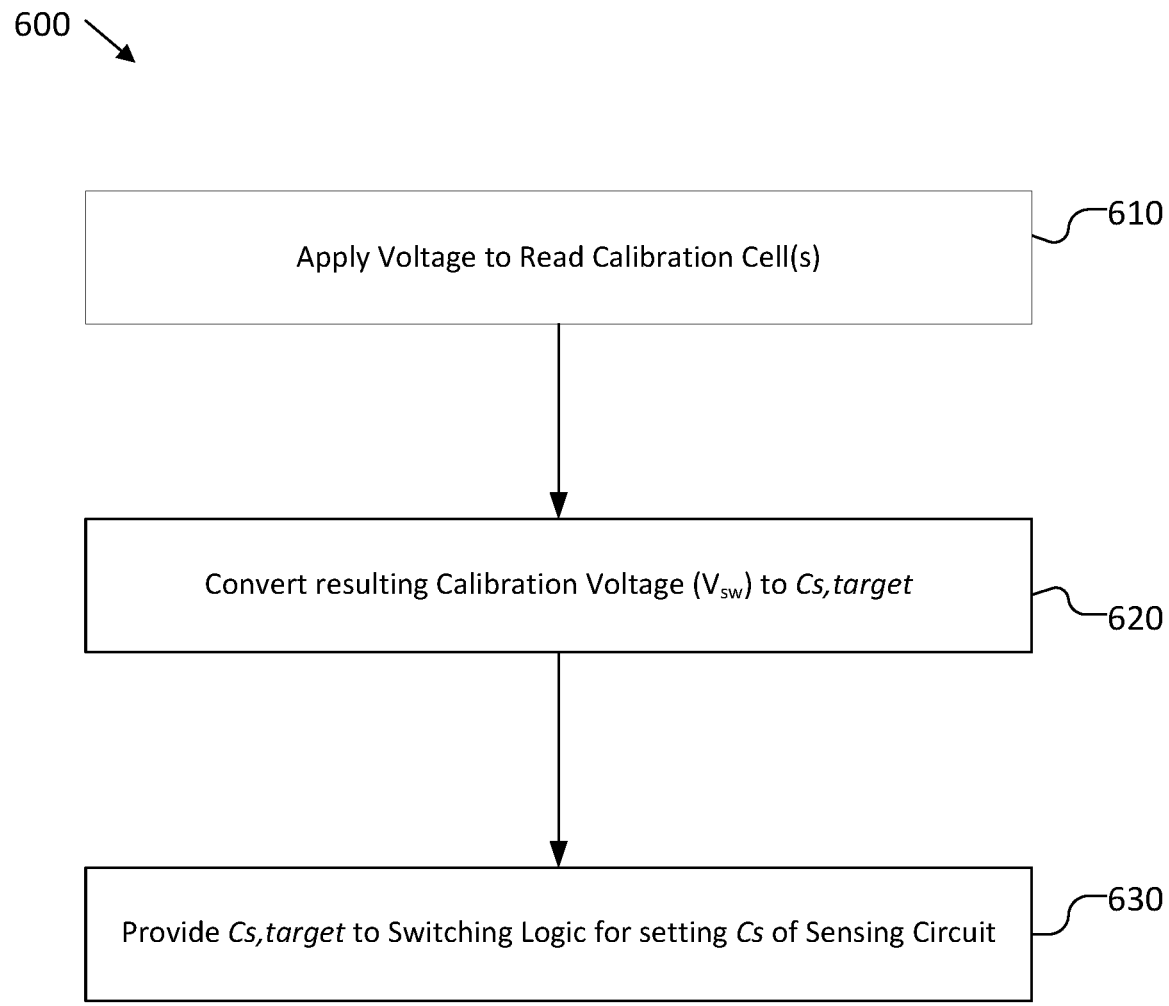
FIG. 6 shows an exemplary flow diagram depicting how a calibration circuit may determine a target sensing capacitance from a calibration cell or calibration cells that are read in parallel.

FIG. 6 is an exemplary flow diagram 600 depicting how the calibration circuit (e.g., calibration circuit 400 and/or 500) may determine the sensing capacitance for a sensing circuit of a memory to use when reading memory cells. The calibration circuit may, in 610, apply a read voltage to the calibration cell(s) as $V_{PL}$ to develop a switching charge from the calibration cell(s). Next, the calibration circuit may, in 620, convert a calibration voltage (Vsw) developed by the switching charge over a calibration capacitor into a target value for the sensing capacitance (Cs,target) to be used by the sensing circuit of the memory, where the target value for the sensing capacitance is based on the calibration voltage (e.g., having a relationship, having a direct relationship, having a proportional relationship, having a direct proportional relationship, etc.). Next, in 630, the calibration circuit may provide the target value for the sensing capacitance (Cs,target) to the sensing circuit of the memory for reading the memory cells.

Figure 7:
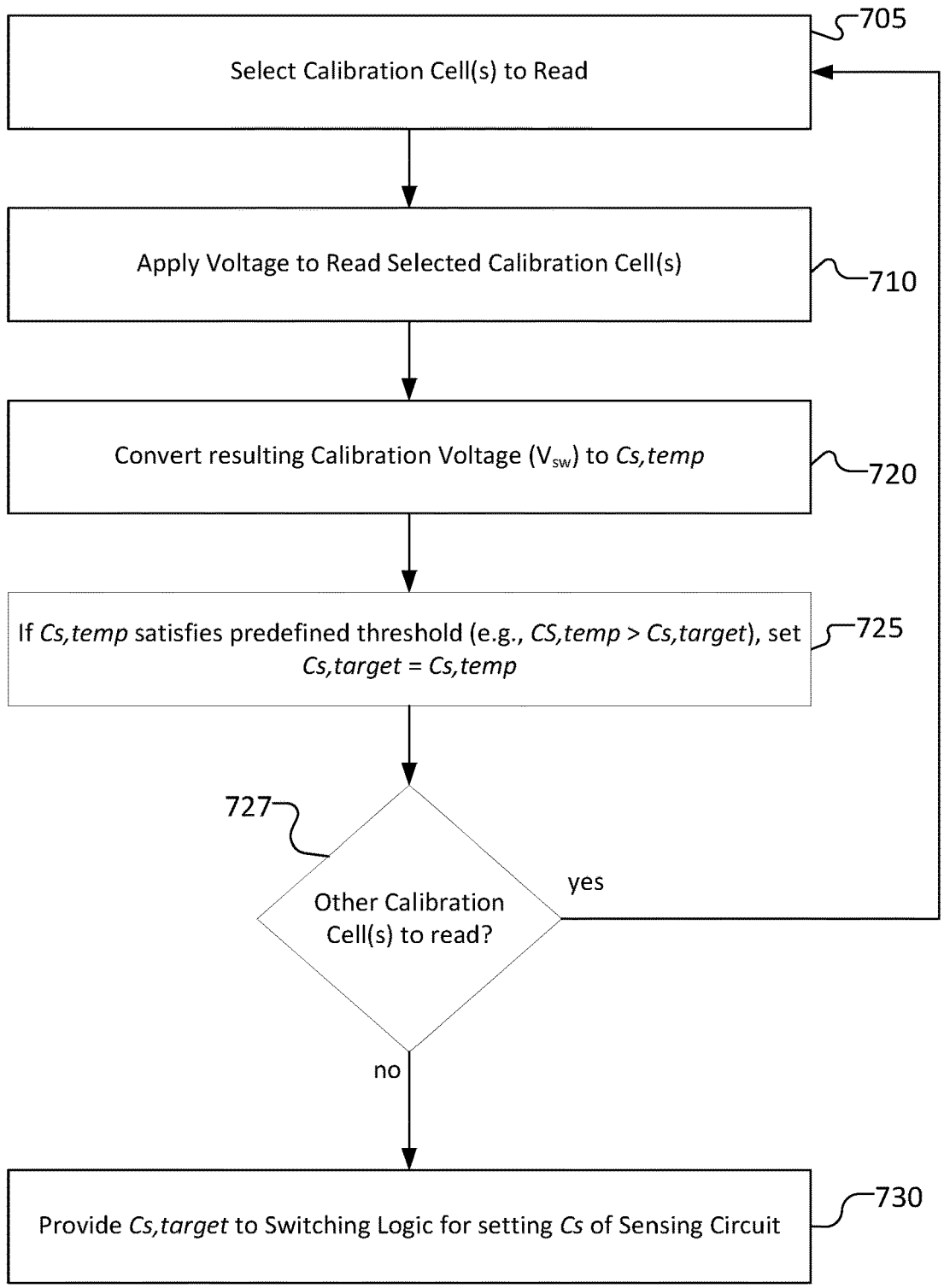
FIG. 7 shows an exemplary flow diagram depicting how a calibration circuit may determine a target sensing capacitance from multiple calibration cells that are selected and read in sequence.

FIG. 7 is an exemplary flow diagram 700 depicting how the calibration circuit (e.g., calibration circuit 400 and/or 500) may determine the read voltage level for a memory to use when reading memory cells. The calibration circuit may, in 705, select a calibration cell or grouping of calibration cells to read and, in 710, apply a read voltage to the selected calibration cell(s) as $V_{PL}$ to develop a switching charge from the calibration cell(s). Next, the calibration circuit may, in 720, convert the calibration voltage (Vsw) developed by the switching charge over a calibration capacitor into a temporary target value for the sensing capacitance (Cs,temp), where the temporary target value for the sensing capacitance is based on the accumulated calibration voltage (e.g., having a relationship, having a direct relationship, having a proportional relationship, having a direct proportional relationship, etc.). Next, in 725, the calibration circuit may determine whether the temporary target value for the sensing capacitance satisfies a predefined criterion (e.g., if the value of Cs,temp is greater than the previously determined Cs,target value, the current Cs,temp value is stored as the Cs, target value). Next, the calibration circuit checks, in 727, whether other calibration cell(s) should be read, and if so, the process repeats at 705 by selecting the next calibration cell(s). Once all the calibration cell(s) have been read, the calibration circuit may, in 730, provide the final value for the target sensing capacitance (Cs,target) to the sensing circuit of the memory for reading the memory cells.

In conventional memories the value of the sensing capacitance is a fixed value. This may be problematic because the switching charge developed by the read operation is not necessarily a single, fixed value for all memory cells and may also change over time, after a large number of reads, at different temperatures, etc. As noted above, when viewing all the memory cells of the memory together, the switching charge delivered by the memory cells may be understood as having a distribution from a minimum switching charge ($Q_{sw,min}$) to maximum switching charge ($Q_{sw,max}$). If the sensing capacitance is set to a value higher than that corresponding to a successful read of $Q_{sw,min}$, for example, a sensing capacitance value corresponding to $Q_{sw,median}$ of the distribution or one corresponding to $Q_{sw,max}$ of the distribution, memory cells that deliver switching charges lower than $Q_{sw,median}$ or $Q_{sw,max}$ may not be read correctly. Thus, when selecting a fixed value for the sensing capacitance, the sensing circuit is usually designed to have a low enough value for the sensing capacitance so that it may successfully read the switching charges at the low-end of the distribution. However, by fixing the sensing capacitor to be based on the switching charge at the low-end of the distribution, the sensing circuit may become vulnerable to sensing a disturbance as if it were the charge developed by the memory cell intended to be read (e.g., a disturbance in the form of a charge coupled onto the bit line from sources other than from the memory cell intended to be read), especially where the $Q_{sw}$ of a particular cell is much larger than $Q_{sw,min}$.

Figure 8:
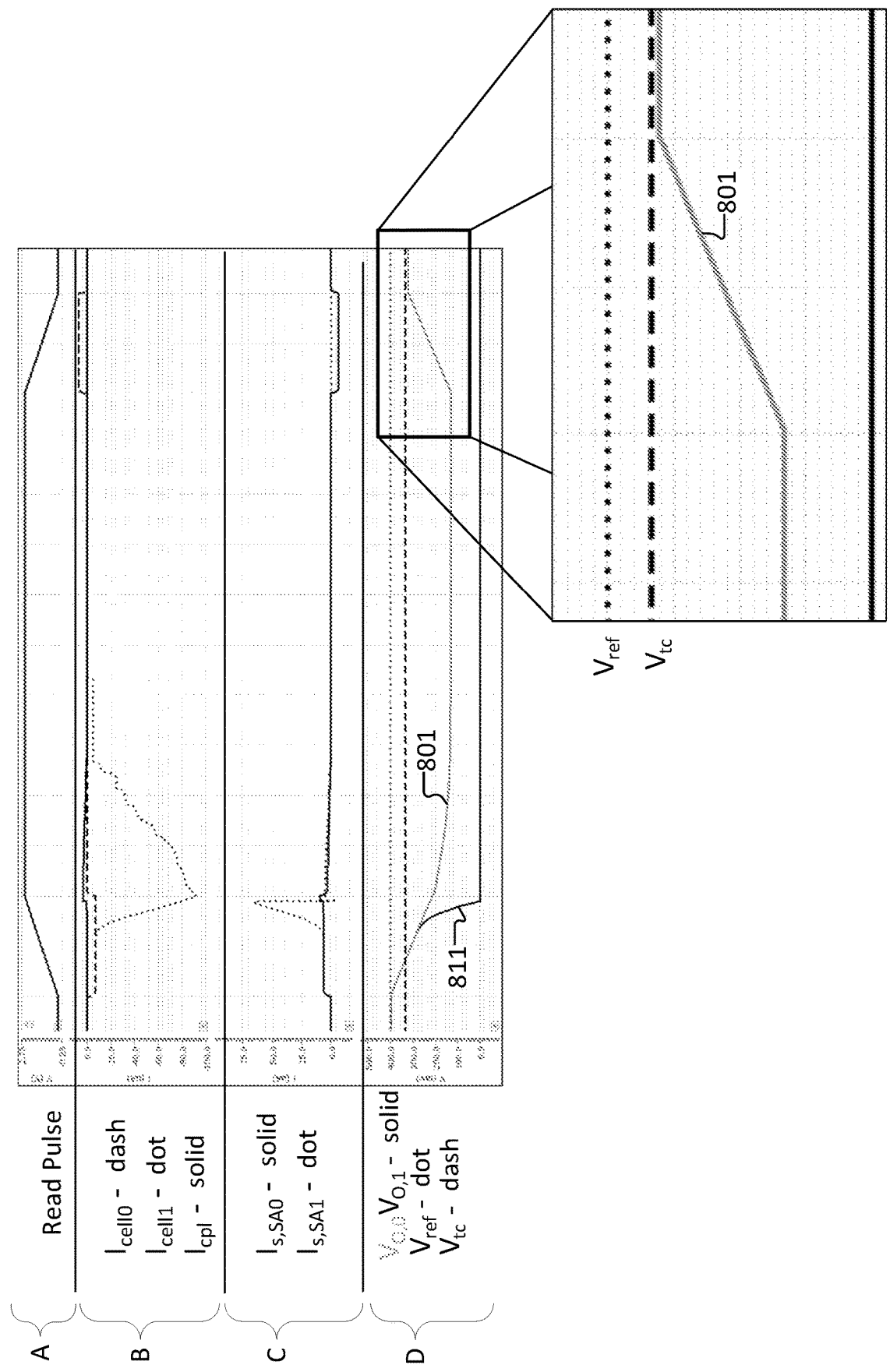
FIG. 8 shows an exemplary graph of currents and voltages for an exemplary read operation of adjacent memory cells programmed to different states.

This problem is depicted for example in FIG. 8, which graphs currents and voltages for an exemplary read operation of adjacent memory cells, one programmed to a zero (e.g., which should develop no switching charge when a read voltage is applied) and one programmed to a one (e.g., which should develop a switching charge corresponding to $Q_{sw}$ when a read voltage is applied). The top portion "A" of the graph depicts a read pulse of the read voltage that is applied during a read operation. The portion "B" of the graph depicts the currents developed from each of the cells ($I_{cell0}$ for the cell programmed to zero and $I_{cell1}$ for the cell programmed to one) along with the current that may be coupled from one bit line to another ($I_{cpl}$). The portion "C" of the graph depicts the currents aggregated over each sensing capacitor of the sensing amplifier ($I_{s,SA0}$ for the sensing amplifier of the cell programmed to "0" and $I_{s,SA1}$ for the sensing amplifier of the cell programmed to "1"). The portion "D" of the graph depicts the output voltages ($V_O$) developed on each bit line associated with each cell ($V_{O,0}$ associated with the cell programmed to zero plotted on line 801 and $V_{O,1}$ associated with the cell programmed to one plotted on line 811). These voltages are plotted in relation to the reference voltage (Vref) and the threshold voltage (Vtc), where an output voltage level above Vtc indicates a read state of "0" and below Vtc indicates a read state of "1".

As can be seen in FIG. 8, if the switching charge on the bit line associated with the cell programmed to state "1" is high, it may cause a disturb on the adjacent bit line such that the output voltage on the adjacent bit line (represented by line 801) accumulated on the sensing capacitor is high. This may cause, as seen in the call-out section of FIG. 8, the output voltage to remain below the threshold voltage (Vtc), meaning that the read operation misreads the disturb as a read state of "1", even though the cell was programmed to state of "0". Selecting a higher sensing capacitance for such a read operation may reduce the gain of the sensing amplifier, which in turn may reduce the likelihood that the disturb causes a misread.

Figure 9:
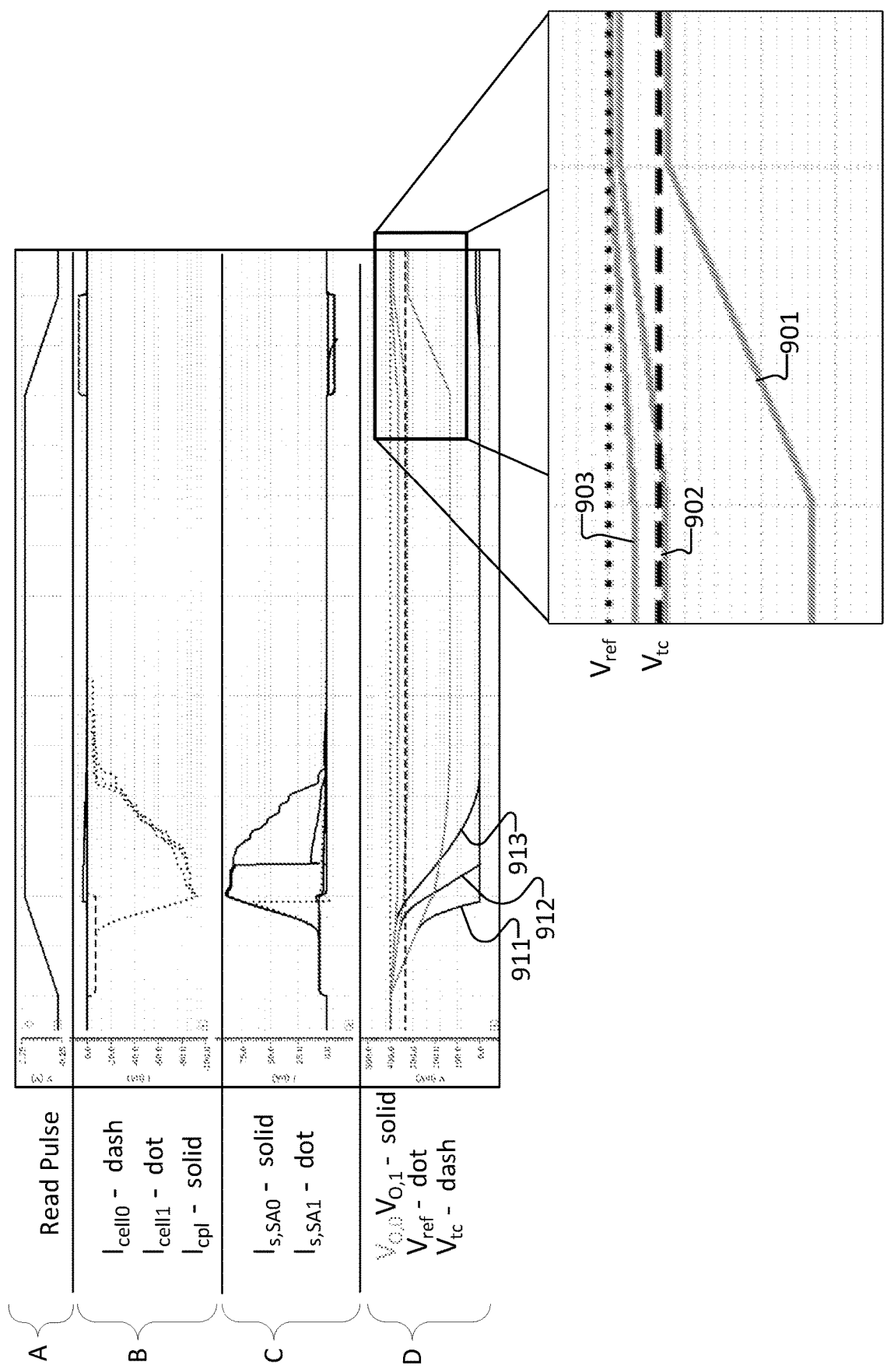
FIG. 9 shows an exemplary graph of currents and voltages for an exemplary read operation of adjacent memory cells programmed to different states, for three different sensing capacitances.

For example, FIG. 9 shows a similar plot to FIG. 8 of the currents and voltages for an exemplary read operation of adjacent memory cells, except that voltages for three different sensing capacitance values are plotted in portion "D." Thus, for each bit line, three different output voltages are plotted. As can be seen with respect to the voltages developed on the bit line associated with the cell programmed to "1" ($V_{O,1}$), the output voltage saturates to zero for each of the plotted sensing capacitance values, where line 911 is the output voltage associated with a low sensing capacitance (as in FIG. 8 such that line 811 corresponds to line 911), line 912 is the output voltage associated with a higher capacitance, and line 913 is the output voltage associated with the highest capacitance. For the output voltage on the bit line associated with the cell programmed to "0" ($V_{O,0}$), however, the different capacitance values may lead to different read values. For the bit line associated with the cell programmed to "0", line 901 plots the output voltage associated with the low sensing capacitance (as in FIG. 8 such that line 801 corresponds to line 901), line 902 plots the output voltage associated with the higher capacitance, and line 903 plots the output voltage associated with the highest capacitance. As can be seen for the higher capacitances associated with lines 902 and 903 (as compared to the capacitance associated with line 901), the output voltage has increased such that it remains above the threshold voltage (Vtc), meaning that the read operation correctly reads, despite the disturb, a read state of "0".

Thus, in contrast to conventional memories that use a fixed value of the sensing capacitance, the calibration circuits discussed above allow for determining a tunable sensing capacitance for a particular memory cell (or cells) that is based on a calibration cell (or cells) so that an "ideal" capacitance may be determined and then used for reading the corresponding memory cell(s) of the memory. For example, for memory cells that deliver a higher switching charge, the calibration circuit may select a higher capacitance value as the sensing capacitance, which may help reduce the impact of a disturbance from a high switching charge onto simultaneously-read bit lines. Similarly, for memory cells of the memory that deliver a lower switching charge, the calibration circuit may select a lower capacitance value as the sensing capacitance in order to ensure that that these lower switching charges are properly read. In short, using a calibration cell to set the sensing capacitance allows the memory to adjust for variations in switching charge delivered by the memory cells that may result from aging, temperature changes, manufacturing tolerances, etc.

Figure 10:
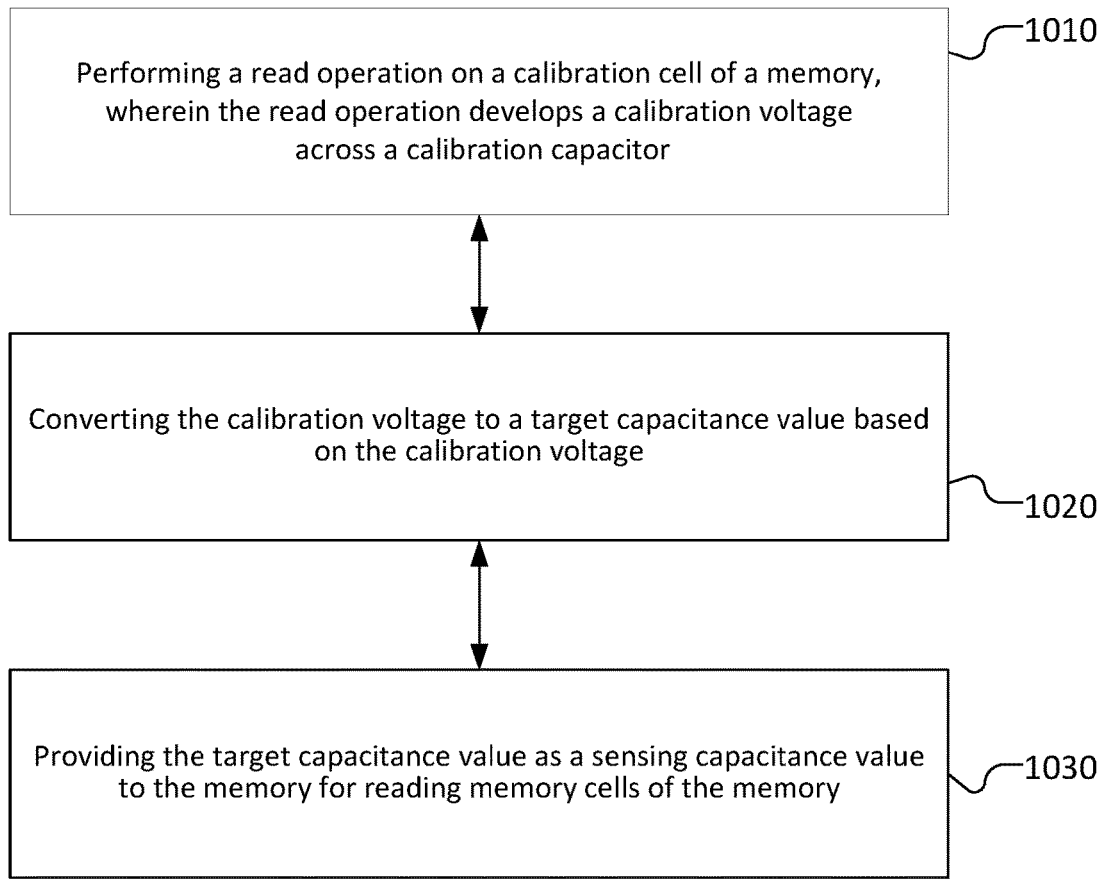
FIG. 10 depicts an exemplary schematic flow diagram of a method for calibrating, based on calibration cell(s), a target sensing capacitance to be used as a sensing capacitance when reading memory cells of a memory.

FIG. 10 depicts an exemplary schematic flow diagram of a method 1000 for calibrating, based on a calibration cell or cells, a read voltage to be used for reading memory cells of a memory. Method 1000 may implement any of the features and/or structures described above with respect to the configuration circuit (e.g., calibration circuits 400 and/or 500) described above with respect to FIGS. 1-9.

Method 1000 is for calibrating a sensing capacitance value for reading memory cells of a memory and includes, in 1010, performing a read operation on a calibration cell of the memory, wherein the read operation develops a calibration voltage across a calibration capacitor. Method 1000 also includes, in 1020, converting the calibration voltage to a target capacitance value based on the calibration voltage. Method 1000 also includes, in 1030, providing the target capacitance value as the sensing capacitance value to the memory for reading the memory cells.

In the following, various examples are provided that may include one or more aspects described above with reference to calibrating a read voltage to be used for reading memory cells of a memory. It may be intended that aspects described in relation to the circuits may apply also to the described method(s), and vice versa.

Example 1 is a calibration circuit for calibrating a sensing capacitance used by a sensing circuit when reading memory cells of a memory. The calibration circuit includes a calibration cell associated with a predefined programming state of the calibration cell. The calibration circuit also includes a read circuit configured to perform a read operation on the calibration cell that generates a calibration voltage based on the predefined programming state. The read circuit is also configured to convert the calibration voltage to a target capacitance value based on the calibration voltage (e.g., having a relationship, having a direct relationship, having a proportional relationship, having a direct proportional relationship, etc.). The read circuit is also configured to provide the target capacitance value to the memory as the sensing capacitance for the sensing circuit when reading the memory cells of the memory.

Example 2 is the calibration circuit of example 1, wherein the calibration circuit further includes an analog-to-digital converter (ADC), wherein the read circuit configured to convert the calibration voltage to the target capacitance value includes the ADC configured to measure a voltage level of the calibration voltage and convert the voltage level to a digital representation of the target capacitance value.

Example 3 is the calibration circuit of either of examples 1 or 2, wherein the calibration cell includes a state-programmable memory element.

Example 4 is the calibration circuit of example 3, wherein the state-programmable memory element includes a remanent-polarizable capacitor, wherein the predefined programming state includes one of a plurality of remanently-polarizable states of the remanent-polarizable capacitor.

Example 5 is the calibration circuit of example 4, wherein the calibration voltage is associated with a switching charge provided during the read operation when the remanent-polarizable capacitor is programmed from the predefined programming state to another of the plurality of remanently-polarizable states.

Example 6 is the calibration circuit of example 5, wherein the read circuit includes a sensing circuit configured to develop the switching charge across a calibration capacitor during the read operation to define the calibration voltage.

Example 7 is the calibration circuit of any one of examples 1 to 6, wherein the read circuit configured to convert the calibration voltage to the target capacitance value based on the calibration voltage includes a direct relationship to convert the calibration voltage to the target capacitance value, wherein a higher calibration voltage corresponds to a higher target capacitance value and a lower calibration voltage corresponds to a lower target capacitance value.

Example 8 is the calibration circuit of any one of examples 1 to 7, wherein the calibration cell includes a plurality of calibration cells. Each of the plurality of calibration cells is associated with the predefined programming state. The calibration cell includes one of the plurality of calibration cells.

Example 9 is the calibration circuit of example 8, wherein the read circuit configured to perform the read operation and convert the calibration voltage includes the read circuit configured to: perform as the read operation a parallel read operation on the plurality of calibration cells; and convert the calibration voltage from the parallel read operation to the target sensing capacitance value.

Example 10 is the calibration circuit of example 9, wherein the parallel read operation includes accumulating from the plurality of calibration cells a cumulative switching charge across a calibration capacitor to define the calibration voltage.

Example 11 is the calibration circuit of any one of examples 1 to 10, wherein the read circuit configured to perform the read operation and convert the calibration voltage includes the read circuit configured to: perform as the read operation a series of individual read operations, wherein each one of the series of individual read operations is of an individual one of the plurality of calibration cells and is configured to convert the calibration voltage across the individual one to a temporary target sensing capacitance value and select the temporary target sensing capacitance value as the target sensing capacitance value based on a predetermined criterion.

Example 12 is the calibration circuit of example 11, wherein each one of the series of individual read operations includes accumulating from the individual ones of the plurality of calibration cells a switching charge across a calibration capacitor to define the calibration voltage.

Example 13 is the calibration circuit of either one of examples 11 or 12, wherein the predetermined criterion includes whether the temporary target sensing capacitance value is greater than the target sensing capacitance value.

Example 14 is a memory that includes a plurality of calibration cells. The memory also includes a plurality of memory cells. The memory also includes a calibration circuit configured to determine a sensing capacitance value based on a read operation of the plurality of calibration cells. The memory also includes a memory read circuit configured to read the plurality of memory cells based on the sensing capacitance value.

Example 15 is the memory of example 14, wherein the calibration circuit configured to determine the sensing capacitance value based on the read operation includes the calibration circuit configured to: individually read a read state of each calibration cell of the plurality of calibration cells that develops a calibration voltage over a calibration capacitor; convert the calibration voltage to a temporary target sensing capacitance value based on the calibration voltage (e.g., having a relationship, having a direct relationship, having a proportional relationship, having a direct proportional relationship, etc.); and select the temporary target sensing capacitance value as the sensing capacitance value based on a predefined criterion.

Example 16 is the memory of either one of examples 14 or 15, wherein the calibration circuit configured to determine the sensing capacitance value based on the read operation includes the calibration circuit configured to: read a composite read state of the plurality of calibration cells that develop a composite calibration voltage over a calibration capacitor; and convert the composite calibration voltage to the sensing capacitance value based on the composite calibration voltage (e.g., having a relationship, having a direct relationship, having a proportional relationship, having a direct proportional relationship, etc.).

Example 17 is the memory of any one of examples 14 to 16, wherein the memory read circuit is configured to read at least two memory cells of the plurality of memory cells simultaneously, wherein the at least two memory cells have two directly adjacent bit lines associated therewith.

Example 18 is a method for calibrating a sensing capacitance value for reading memory cells of a memory. The method includes performing a read operation on a calibration cell of the memory, wherein the read operation develops a calibration voltage across a calibration capacitor. The method also includes converting the calibration voltage to a target capacitance value based on the calibration voltage (e.g., having a relationship, having a direct relationship, having a proportional relationship, having a direct proportional relationship, etc.). The method also includes providing the target capacitance value as the sensing capacitance value to the memory for reading the memory cells.

Example 19 is the method of example 18, wherein the calibration cell is one of a plurality of calibration cells of the memory, wherein performing the read operation includes performing the read operation on the plurality of calibration cells, wherein the read operation develops the calibration voltage based on a composite switching charge from the plurality of calibration cells.

Example 20 is the method of either one of examples 18 or 19, wherein the calibration cell is one of a plurality of calibration cells of the memory, wherein performing the read operation includes selecting a first calibration cell of the plurality of calibration cells as a selected calibration cell for the read operation, wherein the read operation develops a first sensed calibration voltage across the calibration capacitor based on a switching charge from the selected calibration cell. Performing the read operation also includes selecting a second calibration cell of the plurality of calibration cells as the selected calibration cell and reperforming the read operation to develop a second sensed calibration voltage across the second calibration cell. Converting the sensed calibration voltage to the target capacitance level includes converting the first sensed calibration voltage to a first target capacitance level based on the first sensed calibration voltage and converting the second sensed calibration voltage to a second target capacitance level based on the second sensed calibration voltage. Providing the target capacitance level as the sensing capacitance value includes providing either the first target capacitance level or the second target capacitance level as the sensing capacitance value based on a predefined criterion.

The terms "at least one" and "one or more" may be understood to include any integer number greater than or equal to one, i.e. one, two, three, four, [ . . . ], etc. The term "a plurality" or "a multiplicity" may be understood to include any integer number greater than or equal to two, i.e. two, three, four, five, [ . . . ], etc. The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The term "connected" may be used herein with respect to nodes, terminals, integrated circuit elements, and the like, to mean electrically connected, which may include a direct connection or an indirect connection, wherein an indirect connection may only include additional structures in the current path that do not influence the substantial functioning of the described circuit or device. The term "electrically conductively connected" that is used herein to describe an electrical connection between one or more terminals, nodes, regions, contacts, etc., may be understood as an electrically conductive connection with, for example, ohmic behavior, e.g., provided by a metal or degenerate semiconductor in absence of p-n junctions in the current path. The term "electrically conductively connected" may be also referred to as "galvanically connected".

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A calibration circuit for calibrating a sensing capacitance used by a sensing circuit when reading memory cells of a memory, the calibration circuit comprising:
    a calibration cell associated with a predefined programming state of the calibration cell; wherein the calibration cell comprises a plurality of calibration cells and at least two calibration cells of the plurality of calibration cells are associated with the predefined programming state;
    a read circuit configured to:
        perform a parallel read operation on the at least two calibration cells of the plurality of calibration cells that generates a calibration voltage based on the predefined programming state;
        convert the calibration voltage from the parallel read operation to a target sensing capacitance value based on the calibration voltage;
        provide the target sensing capacitance value to the memory as the sensing capacitance for the sensing circuit when reading the memory cells of the memory.

2. The calibration circuit of claim 1, wherein the calibration circuit further comprises an analog-to-digital converter (ADC), wherein the read circuit configured to convert the calibration voltage to the target sensing capacitance value comprises the ADC configured to measure a voltage level of the calibration voltage and convert the voltage level to a digital representation of the target sensing capacitance value.

3. The calibration circuit of claim 1, wherein the calibration cell comprises a state-programmable memory element.

4. The calibration circuit of claim 3, wherein the state-programmable memory element comprises a remanent-polarizable capacitor, wherein the predefined programming state comprises one of a plurality of remanently-polarizable states of the remanent-polarizable capacitor.

5. The calibration circuit of claim 4, wherein the calibration voltage is associated with a switching charge provided during the read operation when the remanent-polarizable capacitor is programmed from the predefined programming state to another of the plurality of remanently-polarizable states.

6. The calibration circuit of claim 5, wherein the read circuit comprises a sensing circuit configured to accumulate the switching charge on a calibration capacitor during the read operation to define the calibration voltage.

7. The calibration circuit of claim 1, wherein the read circuit configured to convert the calibration voltage to the target sensing capacitance value based on the calibration voltage comprises a direct relationship to convert the calibration voltage to the target sensing capacitance value, wherein a higher calibration voltage corresponds to a higher target capacitance value and a lower calibration voltage corresponds to a lower target capacitance value.

8. The calibration circuit of claim 1, wherein the parallel read operation comprises accumulating from the plurality of calibration cells a cumulative switching charge across a calibration capacitor to define the calibration voltage.

9. The calibration circuit of claim 1, wherein the read circuit configured to perform the read operation and convert the calibration voltage comprises the read circuit configured to:
    perform as the read operation a series of individual read operations, wherein each one of the series of individual read operations is of an individual one of a plurality of calibration cells and is configured to convert the calibration voltage across the individual one to a temporary target sensing capacitance value and select the temporary target sensing capacitance value as the target sensing capacitance value based on a predetermined criterion.

10. The calibration circuit of claim 9, wherein each one of the series of individual read operations comprises accumulating from the individual ones of the plurality of calibration cells a switching charge across a calibration capacitor to define the calibration voltage.

11. The calibration circuit of claim 9, wherein the predetermined criterion comprises whether the temporary target sensing capacitance value is greater than the target sensing capacitance value.

12. A memory comprising:
    the calibration circuit of claim 1, wherein the calibration circuit comprises a plurality of calibration cells; wherein the calibration circuit is configured to determine a sensing capacitance value based on a read operation of the plurality of calibration cells;
    a plurality of memory cells; and
    a memory read circuit configured to read the plurality of memory cells based on the sensing capacitance value.

13. The memory of claim 12, wherein the calibration circuit configured to determine the sensing capacitance value based on the read operation comprises the calibration circuit configured to:
    individually read a read state of each calibration cell of the plurality of calibration cells that develops a calibration voltage over a calibration capacitor;
    convert the calibration voltage to a temporary target sensing capacitance value based on the calibration voltage; and
    select the temporary target sensing capacitance value as the sensing capacitance value based on a predefined criterion.

14. The memory of claim 12, wherein the calibration circuit configured to determine the sensing capacitance value based on the read operation comprises the calibration circuit configured to:
    read a composite read state of the plurality of calibration cells that develop a composite calibration voltage over a calibration capacitor; and
    convert the composite calibration voltage to the sensing capacitance value based on the composite calibration voltage.

15. The memory of claim 12, wherein the memory read circuit is configured to read at least two memory cells of the plurality of memory cells simultaneously, wherein the at least two memory cells have two directly adjacent bit lines associated therewith.

16. A method for calibrating a sensing capacitance value for reading memory cells of a memory, the method comprising:
- performing a read operation on a calibration cell of the memory, wherein the read operation develops a calibration voltage across a calibration capacitor;
- converting the calibration voltage to a target capacitance level based on the calibration voltage; and
- providing the target capacitance level as the sensing capacitance value to the memory for reading the memory cells;

wherein the calibration cell is one of a plurality of calibration cells of the memory, wherein performing the read operation comprises:
- selecting a first calibration cell of the plurality of calibration cells as a selected calibration cell for the read operation, wherein the read operation develops a first sensed calibration voltage across the calibration capacitor based on a switching charge from the selected calibration cell; and
- selecting a second calibration cell of the plurality of calibration cells as the selected calibration cell and reperforming the read operation to develop a second sensed calibration voltage across the second calibration cell, wherein converting the calibration voltage to the target capacitance level comprises converting the first sensed calibration voltage to a first target capacitance level and converting the second sensed calibration voltage to a second target capacitance level, wherein providing the target capacitance level as the sensing capacitance value comprises providing either the first target capacitance level or the second target capacitance level as the sensing capacitance value based on a predefined criterion.

17. The method of claim 16, wherein the calibration cell is one of a plurality of calibration cells of the memory, wherein performing the read operation comprises performing the read operation on the plurality of calibration cells, wherein the read operation develops the calibration voltage based on a composite switching charge from the plurality of calibration cells.

* * * * *